United States Patent
Siegmund

(12) 
(10) Patent No.: US 7,447,927 B2
(45) Date of Patent: Nov. 4, 2008

(54) METHOD AND APPARATUS FOR WAKING UP A SLEEPING SYSTEM

(75) Inventor: Dieter W. Siegmund, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 511 days.

(21) Appl. No.: 11/210,571

(22) Filed: Aug. 23, 2005

(65) Prior Publication Data

US 2007/0050645 A1    Mar. 1, 2007

(51) Int. Cl.
*G06F 1/26* (2006.01)
(52) U.S. Cl. ...................... 713/310; 370/389
(58) Field of Classification Search ............... 713/300, 713/310; 370/389
See application file for complete search history.

(56) References Cited

U.S. PATENT DOCUMENTS

| 7,295,543 | B2 * | 11/2007 | Kikuchi et al. | 370/338 |
| 7,324,518 | B2 * | 1/2008 | Dai et al. | 370/392 |
| 2005/0198219 | A1 * | 9/2005 | Banerjee et al. | 709/200 |
| 2006/0034318 | A1 * | 2/2006 | Fernandes et al. | 370/463 |

* cited by examiner

*Primary Examiner*—Thuan N Du
(74) *Attorney, Agent, or Firm*—Park, Vaughan & Fleming LLP

(57) ABSTRACT

One embodiment of the present invention provides a system that wakes up a sleeping target system located on a target LAN (Local Area Network) from a remote system located on a remote LAN. Note that, since the sleeping target system is in a sleep state, it receives packets of a lower-layer protocol which cannot be used by the remote system to directly send packets to the sleeping target system. During operation, the remote system creates a wake-up packet. The remote system then uses a second protocol to send the wake-up packet to a relay agent located on the target LAN. Note that using the upper-layer protocol enables the remote system to communicate with the relay agent even though they are on different LANs. Upon receiving the first wake-up packet, the relay agent uses the lower-layer protocol to send a second wake-up packet to the sleeping target system, which causes the sleeping target system to wake up. Recall that the remote system cannot use the lower-layer protocol to send a wake-up packet directly to the sleeping target system because the remote system and the sleeping target system are on different LANs. The remote system overcomes this limitation by first sending a wake-up packet to the relay agent using the upper-layer protocol, which causes the relay agent to send another wake-up packet to the sleeping target system using the lower-layer protocol.

7 Claims, 3 Drawing Sheets

DHCP PACKET 200

| 202 | 204 | 206 | 208 |
|---|---|---|---|
| XID 210 ||||
| SECS 212 || FLAGS 214 ||
| CIADDR 216 ||||
| YIADDR 218 ||||
| SIADDR 220 ||||
| GIADDR 222 ||||
| CHADDR 224 ||||
| SNAME 226 ||||
| FILE 228 ||||
| OPTIONS 230 ||||

FIG. 2A

OPTIONS 230

| VENDOR CLASS ID 250 |
|---|
| VENDOR SPEC. INFO. 252 |

FIG. 2B

VENDOR SPECIFIC INFORMATION 252

| 254 | 256 | MAGIC BIT-PATTERN 258 |
|---|---|---|

FIG. 2C

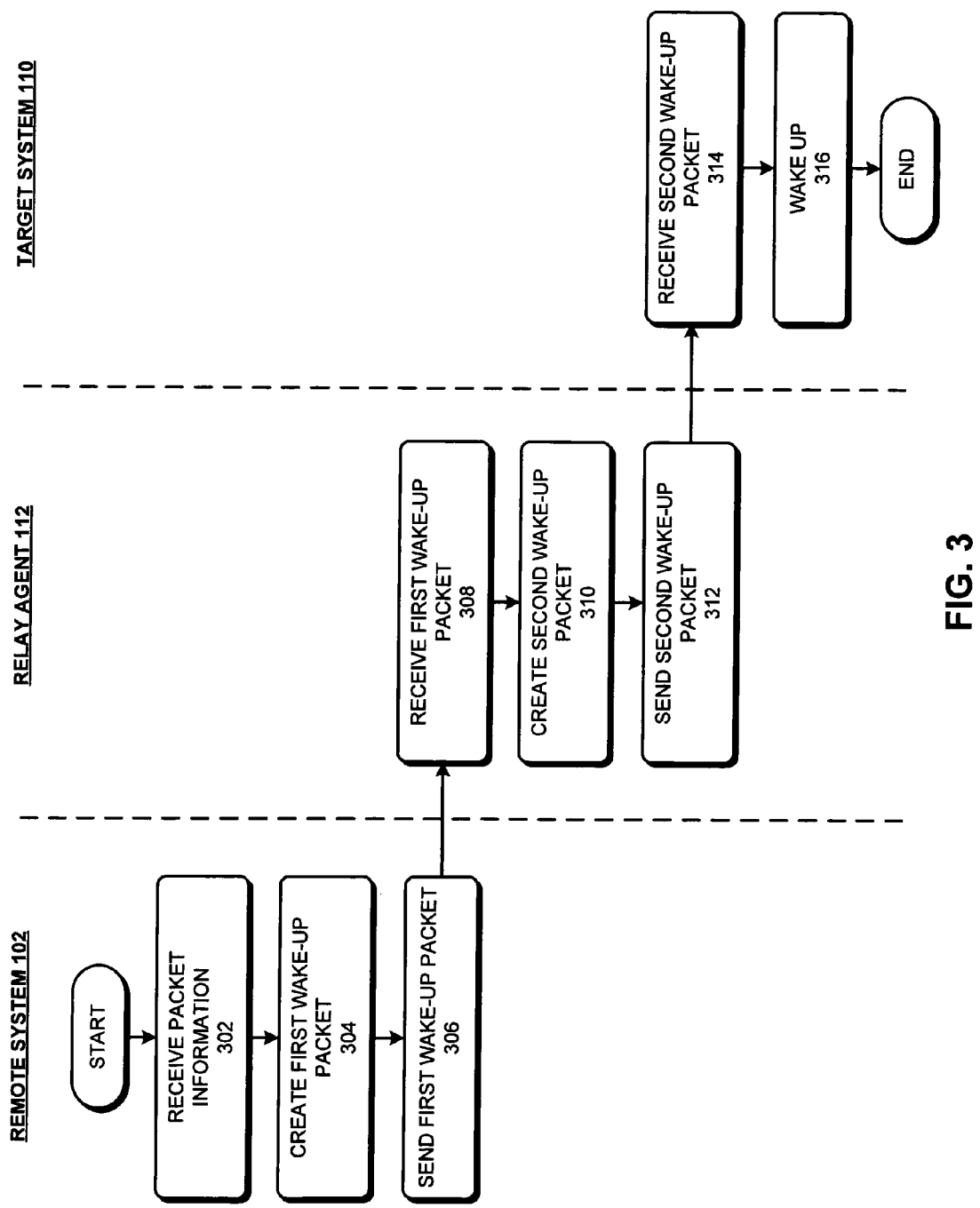

METHOD AND APPARATUS FOR WAKING UP A SLEEPING SYSTEM

BACKGROUND

1. Field of the Invention

The present invention relates to computer networks. More specifically, the present invention relates to a method and an apparatus for waking up a sleeping system which resides on a computer network.

2. Related Art

In recent years, a large number of systems have been brought to the marketplace bearing logos which indicate that the system meets an energy saving standard. An increasing number of these systems are being attached to computer networks to allow workgroups to utilize their services. These systems typically enter a sleep (or power-saving) state when they have not been used for a certain amount of time. In order to restore a sleeping system to a normal operating state, a packet can be sent to the system that contains a specific bit pattern that can "wake up" the system. This packet is commonly referred to as a "magic packet" or "wake-up packet," and the technology as a whole is referred to as "Wake-on-LAN."

Today's enterprise networks can easily contain thousands of systems that are distributed over hundreds of LANs (Local Area Networks). Since a system is usually not fully functional when it is in a sleep state, it is very desirable to have a technique that can wake-up any sleeping system in the network.

In a sleep state, a system can typically receive packets of lower-layer protocols, such as Ethernet, but cannot respond to ARP (Address Resolution Protocol) requests. Unfortunately, being able to respond to ARP packets is often necessary for receiving packets of upper-layer protocols, such as IP (Internet Protocol). Hence, the wake-up packet is generally sent using a lower-layer protocol, such as Ethernet, instead of using an upper-layer protocol, such as IP. Unfortunately, such lower-layer protocols can only be used for sending packets within a LAN.

Consequently, present techniques for waking up sleeping systems are only applicable within a LAN, and they typically cannot be used to wake up systems across enterprise networks that are usually large and contain multiple LANs.

Hence, what is needed is a method and an apparatus for waking up a sleeping system from a remote system that is located on a different LAN.

SUMMARY

One embodiment of the present invention provides a system that wakes up a sleeping target system located on a target LAN (Local Area Network) from a remote system located on a remote LAN. Note that, since the sleeping target system is in a sleep state, it receives packets of a lower-layer protocol which cannot be used by the remote system to directly send packets to the sleeping target system. During operation, the remote system creates a wake-up packet. The remote system then uses an upper-layer protocol to send the wake-up packet to a relay agent located on the target LAN. Note that using the upper-layer protocol enables the remote system to communicate with the relay agent even though they are on different LANs. Upon receiving the first wake-up packet, the relay agent uses the lower-layer protocol to send a second wake-up packet to the sleeping target system, which causes the sleeping target system to wake up. Recall that the remote system cannot use the lower-layer protocol to send a wake-up packet directly to the sleeping target system because the remote system and the sleeping target system are on different LANs. The remote system overcomes this limitation by first sending a wake-up packet to the relay agent using the upper-layer protocol, which causes the relay agent to send another wake-up packet to the sleeping target system using the lower-layer protocol.

In an embodiment, the first wake-up packet contains a lower-layer-protocol address of the sleeping target system which is valid within the target LAN, and a magic bit-pattern which if received by the sleeping target system causes the sleeping target system to wake up.

In an embodiment, the lower-layer-protocol address is an Ethernet address associated with an interface of the sleeping target system which is coupled with the target LAN.

In an embodiment, the first wake-up packet includes a DHCP (Dynamic Host Configuration Protocol) reply packet whose header contains a client hardware address field which is set to the lower-layer-protocol address of the sleeping target system, a client Internet Protocol (IP) address field which is set to an IP address associated with the sleeping target system, and a relay agent IP address field which is set to an IP address associated with the relay agent which is coupled with the target LAN.

In an embodiment, the second wake-up packet is an Ethernet packet whose destination address field is set to the lower-layer-protocol address of the sleeping target system, and whose payload contains the magic bit-pattern.

In an embodiment, the magic bit-pattern contains a bit representation of the lower-layer-protocol address of the sleeping target system.

In an embodiment, the lower-layer protocol is Ethernet, the upper-layer protocol is IP (Internet Protocol), and the first wake-up packet is an IP packet which contains a DHCP (Dynamic Host Configuration Protocol) reply packet.

In an embodiment, the relay agent is a DHCP (Dynamic Host Configuration Protocol) relay agent, such as an IP (Internet Protocol) router.

In an embodiment, the system determines the IP address of the relay agent based on the IP address of the sleeping target system and a subnet mask.

BRIEF DESCRIPTION OF THE FIGURES

FIG. 2A illustrates a DHCP packet that contains multiple pieces of information that can be used by a remote system to wake up a sleeping target system in accordance with an embodiment of the present invention.

FIG. 2B illustrates how an option field can be used in DHCP to specify vendor specific information in accordance with an embodiment of the present invention.

FIG. 2C illustrates how a vendor specific information field can be used to carry a magic bit-pattern in accordance with an embodiment of the present invention.

FIG. 3 presents a flowchart that illustrates a process for waking up a sleeping system in accordance with an embodiment of the present invention.

DETAILED DESCRIPTION

Figure 1:
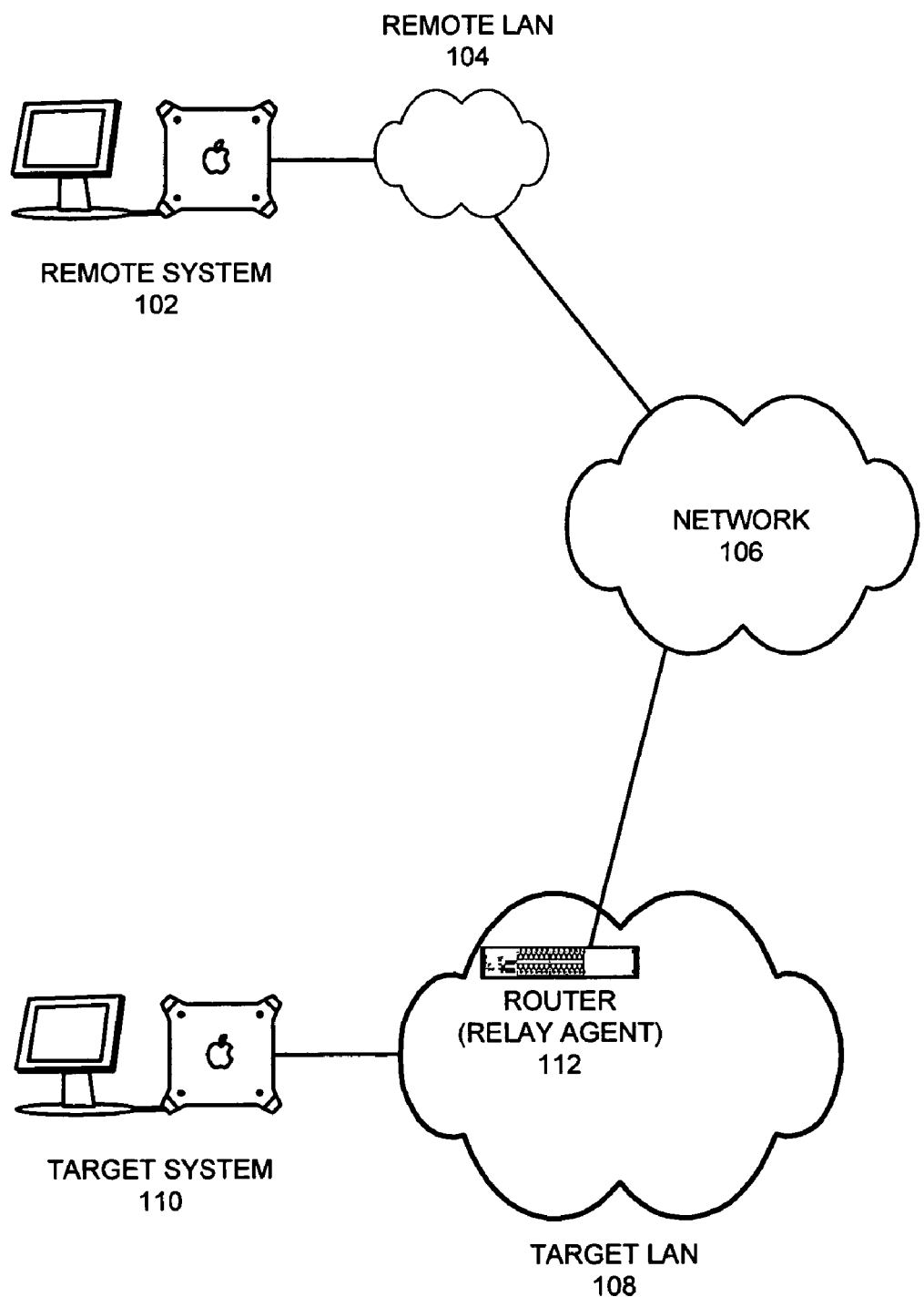
FIG. 1 illustrates a network which couples multiple LANs (Local Area Networks) in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Network

FIG. 1 illustrates a network which couples multiple LANs (Local Area Networks) in accordance with an embodiment of the present invention.

Remote LAN 104 contains remote computer system 102, and target LAN 108 contains target computer system 110. Network 106 couples remote LAN 104 with target LAN 108, which can contain router 112.

Network 106 can generally include any type of wire or wireless communication channel capable of coupling together networks. This includes, but is not limited to, a single communication device, a local area network, a wide area network, or a combination of networks. In one embodiment of the present invention, network 106 includes the Internet. In another embodiment of the present invention, network 106 is a router, and LANs 104 and 108 are directly coupled with one another through the router.

A network node, such as remote system 102, can generally include any type of communication device capable of communicating with other network nodes via a network. This includes, but is not limited to, a computer system based on a microprocessor, a mainframe computer, a server, a printer, a video camera, an external disk drive, a router, a switch, a personal organizer, and a mobile phone.

A LAN typically covers a local area, like a home, office or small group of buildings such as a college. A network node within a LAN is typically associated with a local address which is valid only within the LAN. For example, an Ethernet address is only valid within the Ethernet LAN. Since a local address is usually valid only within a LAN, remote system 102 typically cannot communicate with target system 110 using target system 110's local address.

Wake-on-LAN

Wake-on-LAN is a technology that allows a user to wake up sleeping systems by sending a special packet to the sleeping system. The special packet contains a "magic bit-pattern" which when received by a sleeping system can cause the sleeping system to wake up. For example, a Magic Packet™ (trademark of Advanced Micro Devices) is an example of a special packet that can be used to wake up sleeping system. Specifically, a Magic Packet™ is an Ethernet packet with the following magic bit-pattern: the bytes "0xFFFFFFFFFFFF" followed by sixteen repetitions of the sleeping target system's Ethernet address. Additionally, the magic bit-pattern can also contain a password which ensures that only authorized users can wake up the sleeping system.

The sleeping target system usually contains special hardware that can recognize the magic bit-pattern and wake up the system. For example, in many systems the motherboard is coupled to the network card so that the network card can send a wake-up signal to the motherboard. Additionally, the motherboard's BIOS (Basic Input Output System) is typically configured to wake up the system when it receives a wake-up signal from the network card. Note that it may be necessary to configure the system to leave the network card active when the rest of the system is powered down, otherwise the system will not be able to receive the magic packet.

In a sleep state, a computer system typically cannot respond to ARP (Address Resolution Protocol) requests. As a result, remote systems typically cannot send packets to a sleeping target system using IP (Internet Protocol). Hence, the wake-up packet is typically sent using a lower layer protocol, such as Ethernet. Unfortunately, such lower layer protocols are usually valid only within a LAN. That's why Wake-on-LAN typically works only within a LAN.

Note that it may be possible to send a wake-up packet from a remote system to a target system using IP broadcast packets, but turning on IP broadcast in the network can cause serious security and performance problems. For example, if IP broadcast is turned on in a network, a malicious user can flood the network with broadcast packets. That is why most system administrators do not turn on IP broadcast in a network, and hence wake-up packets typically cannot be sent using IP broadcast.

Further, defining a new protocol that allows a system to send wake-up packets from a remote system requires the protocol software to be installed throughout the network, which may involve installing software on thousands if not millions of systems. Obviously, installing new software on such large numbers of systems can be extremely costly.

Hence, what is needed is a technique that uses unicast packets to wake up a sleeping target system from a remote system using existing protocols and/or software in the network.

One embodiment of the present invention provides such a technique which uses DHCP (Dynamic Host Configuration Protocol). Note that DHCP is not designed for remotely waking up sleeping systems; instead, DHCP is designed to send configuration information to network nodes that are already awake. The instant application describes a clever and nonobvious technique that uses DHCP to send wake-up packets, instead of sending configuration information.

Specifically, one embodiment of the present invention exploits the following properties of DHCP: (a) most routers in a network are DHCP relay agents, (b) DHCP packets can carry a user-defined payload, and (c) DHCP allows a remote system to specify a hardware address which the relay agent uses to send a DHCP packet to the target system.

The following discussion provides further details on DHCP, and how it can be used for remotely waking up a sleeping system.

DHCP (Dynamic Host Configuration Protocol)

DHCP is a commonly-used protocol that was designed to automatically assign IP addresses to network nodes. It has subsequently been extended to allow a network node to lookup configuration information.

FIG. 2A illustrates a DHCP packet that contains multiple pieces of information that can be used by a remote system to wake up a sleeping target system in accordance with an embodiment of the present invention.

DHCP packet 200 contains an opcode field 202, a hardware address type field 204, a hardware address length field 206, a hops field 208, a transaction identifier field 210, a seconds field 212 which keeps track of the seconds elapsed since client began address acquisition or renewal process, and a flags field 214. Furthermore, DHCP packet contains a number of address fields, including a client IP (Internet Protocol) address field 216, a "your" (client) IP address field 218 which can be used to suggest an IP address to a client, a server IP address field 220, a relay agent IP address field 222, a client hardware address field 224, a server name field 226, a boot file name field 228, and a variable length options field 230. (Further details on DHCP can be found in R. Droms, "Dynamic Host Configuration Protocol," *RFC* 2131, March 1997.)

The options field 230 allows a system to specify system specific configuration parameters. (Further details on DHCP options can be found in S. Alexander and R. Droms, "DHCP Options and BOOTP Vendor Extensions," *RFC* 2132, March 1997.)

FIG. 2B illustrates how an option field can be used in DHCP to specify vendor specific information in accordance with an embodiment of the present invention.

Options field 230 can include a vendor class identifier field 250 (option code "0×60") which can be used to identify the vendor type. Options field 230 can also include a vendor specific information field 252 (option code "0×43") to exchange vendor-specific information.

FIG. 2C illustrates how a vendor specific information field can be used to carry a magic bit-pattern in accordance with an embodiment of the present invention.

In DHCP, vendor specific information 252 is specified using a "type-length-value" format. Specifically, the type field 254 can be set to "0×43" to indicate vendor specific information and the length field 256 can be set to the length of value field which can contain the magic bit-pattern 258.

Process of Remotely Waking Up a Sleeping System

FIG. 3 presents a flowchart that illustrates a process for waking up a sleeping system in accordance with an embodiment of the present invention.

The process typically begins by receiving packet information at remote system 102 (step 302). The packet information can include (a) a local address of the sleeping target system 110, (b) a magic bit-pattern which when received by the sleeping target system 110 can cause the sleeping target system 110 to wake up, and (c) information that can be used to communicate with a relay agent, such as router 112, located on the target LAN 108.

In one embodiment, the local address is an Ethernet address associated with an interface of the sleeping target system 110 which is coupled with the target LAN 108.

Note that an IP address of a relay agent, such as router 112, can be used to communicate with the relay agent. Alternatively, a subnet mask associated with the IP address of the sleeping target system can be used to identify a relay agent located on the target LAN.

Specifically, the system can "guess" the IP address of a relay agent based on standard address assignment schemes used by system administrators. Relay agents are typically assigned IP addresses at the end of the subnet address space. This information can be used to guess the IP address of a relay agent.

For example, let 10.0.0.15 be the IP address of the target system, and let 255.255.255.0 be the subnet mask. In this case, the remote system can guess the IP address of a relay agent to be 10.0.0.1 or 10.0.0.254.

The magic bit-pattern can be any pattern that can cause the sleeping target system to wake up. For example, in one embodiment, the magic bit-pattern contains the bytes "0×FFFFFFFFFFFF" followed by sixteen repetitions of the sleeping target system's Ethernet address.

Note that if the magic bit-pattern is a well known standard, it can be hard coded into the system, and hence may not have to be provided by the user. On the other hand, if the magic bit-pattern is specific to the vendor's equipment, it may have to be specified as an input.

The remote system 102 then uses the packet information to create a first wake-up packet (step 304). The first wake-up packet contains information that (a) allows the network to deliver the packet to the relay agent 112, and (b) allows the relay agent 112 to create and send a second wake-up packet to the sleeping target system 110, thereby causing the sleeping target system to wake up.

For example, the system can use DHCP packet 200 to create the first wake-up packet by setting (a) the "yiaddr" field 218 to the sleeping target system's IP address, (b) the "giaddr" field 222 to the relay agent's IP address, and (c) the "chaddr" field 224 to the sleeping target system's local address. Further, the system can store the magic bit-pattern in the options field 230 as shown in FIGS. 2B and 2C. Note that storing the sleeping target system's hardware address in the "chaddr" field 224 enables the relay agent to create and send a wake-up packet to the sleeping target system.

Next, the remote system sends the first wake-up packet to a relay agent, such as router 112, located on the target LAN 108 (step 306). For example, the system can encapsulate DHCP packet 200 in a UDP (User Datagram Protocol) packet and send it to the relay agent 112 using the relay agent's IP address.

The relay agent then receives the first wake-up packet (step 308).

Next, the relay agent creates a second wake-up packet using information contained in the first wake-up packet (step 310). Specifically, if the first wake-up packet was created using DHCP packet 200, the relay agent can use information contained in the "chaddr" field 224 and the options field 230 to create the second wake-up packet.

The relay agent 112 then sends the second wake-up packet to the sleeping target system 110 (step 312). Recall that the first wake-up packet contains the local address of the sleeping target system. The relay agent uses this local address to send the second wakeup packet to the sleeping target system over the target LAN.

Next, the sleeping target system 110 receives the second wake-up packet (step 314). Recall that, since the target system is in a sleep state, it usually cannot process packets that belong to higher layers in the protocol stack, such as the IP layer. This is why the remote system typically cannot send a wake-up packet to the sleeping system directly. But, since the relay system is located on the same LAN as the sleeping target system, it can send a wake-up packet directly to the sleeping target system using a lower layer protocol, such as Ethernet.

Finally, the sleeping target system wakes up (step 316). Note that a number of techniques can be used to couple a network transceiver with the system, so that when the network transceiver detects a magic bit-pattern on the network, it wakes up the system.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art.

Specifically, the present invention is not limited to an IP over Ethernet network. It will be apparent to one skilled in the art that the present invention can be used in any network that contains multiple protocol layers that have relay agents which can be used by remote systems to wake up sleeping systems by sending packets to the relay agent.

To reiterate, the above disclosure is not intended to limit the present invention. The scope of the present invention is defined by the appended claims.

What is claimed is:

1. A method for waking up a sleeping target system located on a target LAN (Local Area Network) from a remote system on a remote LAN, wherein the sleeping target system receives packets of a first protocol which cannot be used by the remote system to send a packet directly to the sleeping target system because the remote system and the sleeping target system are on different LANs, the method comprising:
    creating a first wake-up packet, wherein creating the first wake-un packet involves determining an IP (Internet Protocol) address of a relay agent located on the target LAN based on an IP address of the sleeping target system and a subnet mask; and
    sending the first wake-up packet to the relay agent using a second protocol;
    wherein sending the first wake-up packet to the relay agent causes the relay agent to use the first protocol to send a second wake-up packet to the sleeping target system, which causes the sleeping target system to wake up; and
    wherein the first wake-up packet is a network-layer packet which includes a DHCP (Dynamic Host Configuration Protocol) reply packet whose header contains:
        a client hardware address field which is set to a link-layer address of the sleeping target system;
        a client IP address field which is set to a network-layer address associated with the link-layer address of the sleeping target system; and
        a relay agent network-layer address field which is set to a network-layer address associated with an interface of the relay agent which is coupled with the target LAN, wherein the relay agent located on the target LAN is a DHCP relay agent.

2. The method of claim 1, wherein the first wake-up packet contains:
    a magic bit-pattern which if received by the sleeping target system causes the sleeping target system to wake up.

3. The method of claim 2,
    wherein the first protocol is a lower-layer protocol;
    wherein the second protocol is an upper-layer protocol;
    wherein the magic bit-pattern contains a bit representation of the link-layer address of the sleeping target system;
    wherein the second wake-up packet is an Ethernet packet whose destination address field is set to the link-layer address of the sleeping target system, and whose payload contains the magic bit-pattern.

4. An apparatus which when located on a remote LAN (Local Area Network) which wakes up a sleeping target system located on a target LAN, wherein the sleeping target system receives packets of a first protocol, wherein the apparatus cannot use the first protocol to send a packet directly to the sleeping target system because the apparatus and the sleeping target system are on different LANs, the apparatus comprising:
    a processor;
    a memory which stores instructions that when executed by the processor cause the processor to create a first wake-up packet, wherein creating the first wake-up packet involves determining an IP (Internet Protocol) address of a relay agent located on the target LAN based on an IP address of the sleeping target system and a subnet mask; and
    a network interface configured to send the first wake-up packet to a relay agent using a second protocol;
    wherein sending the first wake-up packet to the relay agent causes the relay agent to use the first protocol to send a second wake-up packet to the sleeping target system, which causes the sleeping target system to wake up; and
    wherein the first wake up packet is a network-layer packet which includes a DHCP (Dynamic Host Configuration Protocol) reply packet whose header contains:
        a client hardware address field which is set to a link-layer address associated with the link-layer address of the sleeping target system; and
        a client IP address field which is set to a network-layer address associated with the link-layer address of the sleeping target system; and
        a relay agent network-layer address field which is set to a network-layer address associated with an interface of the relay agent which is coupled with the target LAN, wherein the relay agent located on the target LAN is a DHCP relay agent.

5. The apparatus of claim 4, wherein the first wake-up packet contains:
    a magic bit-pattern which if received by the sleeping target system causes the sleeping target system to wake up.

6. The apparatus of claim 5,
    wherein the first protocol is a lower-layer protocol;
    wherein the second protocol is an upper-layer protocol;
    wherein the magic bit-pattern contains a bit representation of the link-layer address;
    wherein the second wake-up packet is an Ethernet packet whose destination address field is set to an Ethernet address of the sleeping target system, and whose payload contains the magic bit-pattern.

7. A method for waking up a sleeping target system located on a target LAN (Local Area Network) from a remote system on a remote LAN, wherein the sleeping target system receives packets of a first protocol which cannot be used by the remote system to send a packet directly to the sleeping target system because the remote system and the sleeping target system are on different LANs, the method comprising:
    creating a first wake-up packet, wherein creating the first wake-up packet involves determining the network-layer address of a relay agent based on the network-layer address of the sleeping target system and a subnet mask; and
    wherein the first wake-up packet contains,
        a link-layer address associated with an interface of the sleeping target system which is coupled with the target LAN; and
        a magic bit-pattern containing a bit-representation of the link-layer address, which if received by the sleeping target system causes the sleeping target system to wake up; and
    wherein the first wake-up packet is a network-layer packet which includes a DHCP (Dynamic Host Configuration Protocol) reply packet whose header contains:
        a client hardware address field which is set to the link-layer address of the sleeping target system;
        a client IP address field which is set to a network-layer address associated with the link-layer address of the sleeping target system; and
        the relay agent network-layer address field which is set to the network-layer address associated with an interface of the relay agent which is coupled with the target LAN, wherein the relay agent located on the target LAN is a DHCP relay agent; and sending the first wake-up packet to the relay agent located on the target LAN, wherein the first wake-up packet is sent using a network-layer protocol;

wherein sending the first wake-up packet to the relay agent causes the relay agent to use a link-layer protocol to send a second wake-up packet to the sleeping target system, which causes the sleeping target system to wake up.

\* \* \* \* \*

UNITED STATES PATENT AND TRADEMARK OFFICE
CERTIFICATE OF CORRECTION

PATENT NO. : 7,447,927 B2 Page 1 of 1
APPLICATION NO. : 11/210571
DATED : November 4, 2008
INVENTOR(S) : Dieter W. Siegmund It is certified that error appears in the above-identified patent and that said Letters Patent is hereby corrected as shown below:

In claim 4 (at column 7, line 52), please delete the words "which when" so that the line reads --An apparatus located on a remote LAN--.

Signed and Sealed this

Tenth Day of February, 2009

JOHN DOLL
*Acting Director of the United States Patent and Trademark Office*